UNITED STATES PATENT OFFICE.

THOMAS SIM AND ELIAS S. HUTCHINSON, OF BALTIMORE, MARYLAND.

IMPROVEMENT IN THE MANUFACTURE OF STARCH, DEXTRINE, AND GLUCOSE.

Specification forming part of Letters Patent No. 89,510, dated April 27, 1869.

*To all whom it may concern:*

Be it known that we, THOMAS SIM and ELIAS S. HUTCHINSON, both of Baltimore, in the State of Maryland, have invented certain new and useful Improvements in the Manufacture of Starch, Dextrine, or Gum, and Grape-Sugar; and we do hereby declare the following to be a sufficiently full, clear, and exact description of the same to enable one skilled in the art to which our invention appertains to carry it into effect.

In the manufacture of starch under methods heretofore in use, great waste results from the starch globules being protected by oil or other matter not soluble in water, and, consequently, only a portion of the starch contained in grain or other material being separated and utilized.

Our invention consists in so treating meal or other material from which starch is to be obtained that the oil or other protecting agent will be removed, so that the whole of the starch can afterward be washed out and made available.

For this purpose we place the meal or other material in a large vat, and treat it with bisulphide of carbon, or other chemical, as follows: The liquid bisulphide of carbon, or other chemical, is conducted from a reservoir into the lower part of the vat, so as to rise through and permeate the meal therein, and is made to flow out through a pipe at the top. In this way it dissolves and carries with it all the oil contained in said meal or other material. This solution of oil in the bisulphide of carbon or other chemical is conducted into a separate chamber, in which a partial vacuum is maintained by means of an air-pump, the chamber being kept at a moderate temperature (say 60° Fahrenheit, more or less) by means of warm-water pipes or other means. The bisulphide is thus rapidly separated from the oil, and, being passed through a condensing apparatus, is almost entirely recovered and conducted back to the reservoir for future use. The oil obtained in this manner is of superior quality, and its value is more than sufficient to pay the entire cost of our process.

The meal or other material treated in the manner above described is left in the best possible condition for the manufacture of starch, which may be washed out from it by the ordinary processes, and subsequently treated in the customary manner.

To produce grape sugar or sirup, the starch may be first dissolved out of the meal, and separated from the insoluble matter thereof with hot water. We then macerate in hot water, temperature about 160° Fahrenheit, from fifteen (15) to twenty-five (25) parts of (barley) malt for each one hundred (100) parts of starch contained in the first solution, and mix or stir in the whole together, taking care that the temperature of the mixed solution is maintained at from 158° to 168° Fahrenheit until the desired result is obtained, which will be in about two hours to two hours and a half.

The sirup thus formed may then be evaporated or concentrated in the usual manner.

If the "dextrine" or "gum" is desired instead of the "sugar," it will be necessary to cool the solution at the end of half an hour, or before the grape-sugar has formed by the action of the diastase contained in the malt upon the starch.

By the above processes we are enabled not only to obtain all the starch contained in the crude material, but to utilize it for the purpose of obtaining all the sugar, &c., that can possibly be produced from said material.

It is our intention to apply our invention to the manufacture of starch, and all the products of starch from grain, potatoes, or any other material from which starch may be obtained.

Having thus described our invention, we claim as new and desire to secure by Letters Patent—

As an improvement in the manufacture of starch, or any of the products of starch, the employment or use of bisulphide of carbon, or any equivalent chemical, to separate oil from meal or other material containing starch, in order to release or expose the said starch, substantially as set forth.

To the above specification of our invention we have signed our hands this 1st day of March, 1869.

THOS. SIM.
ELIAS S. HUTCHINSON.

Witnesses:
WM. H. BRERETON, Jr.,
W. B. DEMING.